(12) United States Patent
Ishikawa et al.

(10) Patent No.: US 7,905,320 B2
(45) Date of Patent: Mar. 15, 2011

(54) EXHAUST SYSTEM FOR SADDLE-RIDE TYPE VEHICLE

(75) Inventors: Yuzuru Ishikawa, Saitama (JP); Mitsunobu Imada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 12/055,570

(22) Filed: Mar. 26, 2008

(65) Prior Publication Data

US 2008/0236941 A1  Oct. 2, 2008

(30) Foreign Application Priority Data

Mar. 30, 2007 (JP) .................. 2007-095621

(51) Int. Cl.
*F01N 1/00* (2006.01)
(52) U.S. Cl. .................. 181/254; 181/212; 181/237
(58) Field of Classification Search .................. 181/212, 181/227, 228, 237, 240, 254
See application file for complete search history.

(56) References Cited

U.S. PATENT DOCUMENTS

| | | | | | |
|---|---|---|---|---|---|
| 5,708,237 | A | * | 1/1998 | Maeda et al. | 181/254 |
| 5,971,098 | A | * | 10/1999 | Suzuki et al. | 181/254 |
| 6,065,564 | A | * | 5/2000 | Uegane | 181/237 |
| 6,176,347 | B1 | * | 1/2001 | Chae et al. | 181/254 |
| 6,644,437 | B1 | * | 11/2003 | Hayman | 181/268 |
| 7,273,592 | B2 | * | 9/2007 | Jacob et al. | 422/169 |
| 2003/0079938 | A1 | * | 5/2003 | Yamaguchi | 181/227 |
| 2004/0178015 | A1 | * | 9/2004 | Wiemeler et al. | 181/237 |
| 2006/0000205 | A1 | | 1/2006 | Bozmoski et al. | |
| 2006/0201742 | A1 | * | 9/2006 | Terashima et al. | 181/227 |

FOREIGN PATENT DOCUMENTS

| | | |
|---|---|---|
| DE | 102 09 577 A1 | 9/2002 |
| EP | 0 953 738 B1 | 8/2003 |
| JP | 55 164711 A | 12/1980 |
| JP | 02 061312 A | 3/1990 |
| JP | 2005-105933 A | 4/2005 |
| JP | 2006 207548 A | 8/2006 |

\* cited by examiner

*Primary Examiner* — Elvin G Enad
*Assistant Examiner* — Forrest M Phillips
(74) *Attorney, Agent, or Firm* — Birch, Stewart, Kolasch & Birch, LLP

(57) ABSTRACT

An exhaust valve and a catalyst can be easily disposed of in a simple manner. The interior of a triangular muffler is partitioned into three expansion chambers. A manifold pipe is connected to the second, middle expansion chamber sideways from a lower portion thereof and is accommodated therein so as to face upward. A catalyst is accommodated in the interior of the manifold pipe. Exhaust gas flowing out from an open end of the manifold pipe expands into the second chamber. A short-circuiting aperture is formed in a second separator and is opened and closed with an exhaust valve installed within the third chamber. The exhaust valve is normally closed by a spring. When the exhaust pressure reaches a predetermined magnitude, the exhaust valve opens automatically, allowing the exhaust gas to flow out into the third chamber through the short-circuiting aperture, thereby controlling the exhaust pressure.

16 Claims, 4 Drawing Sheets

EXHAUST SYSTEM FOR SADDLE-RIDE TYPE VEHICLE

CROSS-REFERENCE TO RELATED APPLICATIONS

This nonprovisional application claims priority under 35 U.S.C. §119(a) on Patent Application No. 2007-095621, filed in Japan on Mar. 30, 2007, the entirety of which is incorporated herein by reference.

BACKGROUND OF THE INVENTION

1. Field of the Invention

The present invention relates to an exhaust system for a saddle-ride type vehicle such as, for example, a motorcycle or a buggy. In particular, the present invention is concerned with the structure of a muffler that makes it possible to ensure a sufficient exhaust pipe length and a sufficient minimum road clearance.

2. Background of the Invention

It is known to gather exhaust pipes extending from plural cylinders to a manifold pipe, connect the manifold pipe to a muffler to reduce the exhaust noise, and control the exhaust pressure with use of an exhaust valve (see JP-A No. 2005-105933, for example).

A catalyst is disposed in the manifold pipe, parts of the exhaust system are dispersed to the exterior of the muffler. Therefore, it is desired to concentrate such parts into the muffler. On the other hand, it is necessary to make the muffler as compact as possible, while ensuring a sufficient length of the exhaust pipe, thereby ensuring a sufficient minimum road clearance. However, it is not easy to satisfy such contrary conditions.

SUMMARY OF THE INVENTION

Accordingly, it is an object of the present invention to satisfy such a demand.

For solving the above-mentioned problem, according to a first aspect of the present invention, an exhaust system for a saddle-ride type vehicle is provided, wherein exhaust gas from an engine is discharged from a muffler through an exhaust pipe, the exhaust system comprising an exhaust valve disposed in an exhaust passage within the muffler to control the flow rate of the exhaust gas and a catalyst disposed within the exhaust pipe at a position near an open end as one end of the exhaust pipe, the one end of the exhaust pipe being open into the muffler.

According to a second aspect of the present invention, the exhaust valve can open and close the exhaust passage, and the exhaust valve is urged in a normally closing direction and opens under the action of exhaust pressure.

According to a third aspect of the present invention, a separator is provided within the muffler to partition the interior of the muffler into an expansion chamber in which the open end of the exhaust pipe is disposed and an expansion chamber in which the exhaust valve is disposed, and an aperture is formed in the separator to provide communication between the adjacent expansion chambers, the aperture being opened and closed by the exhaust valve.

According to a fourth aspect of the present invention, the separator functions as an exhaust gas flow uniforming plate when the aperture is closed by the exhaust valve.

According to the first aspect of the present invention, both the exhaust valve and the catalyst are disposed within the muffler. Therefore, in comparison with the situation where both the exhaust valve and the catalyst are separated within an exhaust system outside of the muffler, it is not necessary to ensure any special mounting place for them and they can be mounted easily. Appearance is also improved. Furthermore, since the entire muffler can be made compact, it is possible to ensure a sufficient minimum road clearance. Furthermore, since the catalyst is accommodated within the exhaust pipe at a position near the open end of the exhaust pipe, the exhaust pipe being accommodated within the muffler, the catalyst can be disposed by utilizing the exhaust pipe effectively. Therefore, it is possible to ensure a sufficient length of the exhaust pipe.

According to second aspect of the present invention, the exhaust valve is urged in a normally closing direction by a return spring and opens under the action of a predetermined exhaust pressure. Therefore, the structure is simple and less expensive in comparison with the electronically controlled type of exhaust valve, for example. In addition, it is possible to make the system nearly maintenance-free.

According to the third aspect of the present invention, the interior of the muffler is partitioned by a separator into an expansion chamber in which the open end of the exhaust pipe is located and an expansion chamber in which the exhaust valve is disposed. Therefore, high-temperature exhaust gas just leaving the exhaust pipe can be prevented from direct contact with the exhaust valve. Therefore, it is possible to improve both durability and reliability. Particularly, it is possible to increase the durability of the return spring.

According to the fourth aspect of the present invention, when an aperture that is pre-formed in the separator is closed with the exhaust valve, the separator can be allowed to function as an exhaust gas flow uniforming plate. Therefore, the exhaust gas leaving the open end of the exhaust pipe can be conducted smoothly toward an open end of a communication pipe for communication with the other expansion chamber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE REFERRED EMBODIMENTS

Figure 1:
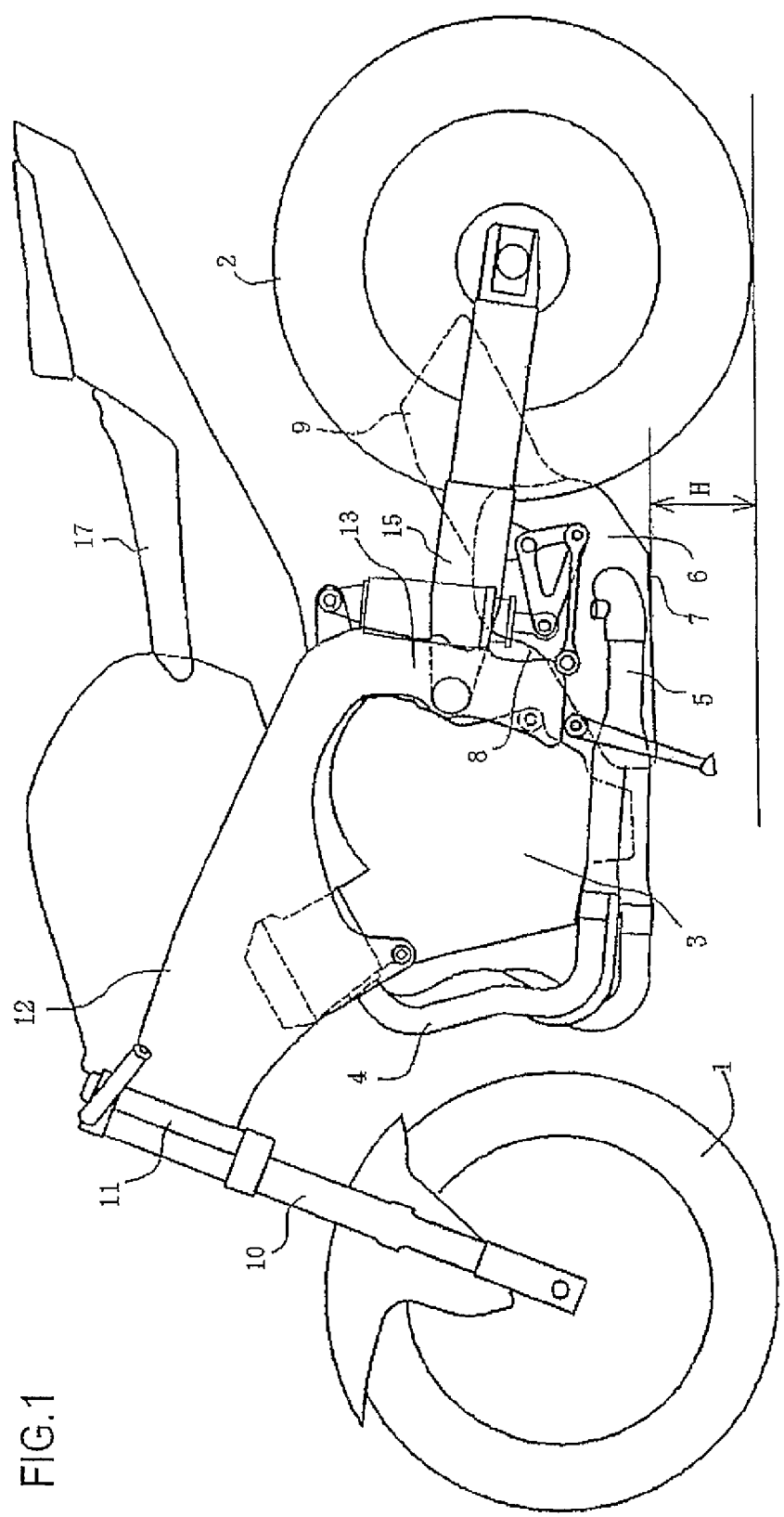
FIG. 1 is a schematic diagram of a motorcycle to which the present invention is applied.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 schematically illustrates a motorcycle to which the present invention is applied. In this motorcycle, a multi-cylinder engine 3 is disposed between a front wheel 1 and a rear wheel 2 and exhaust pipes 4 (only one is shown in the figure) extending from exhaust ports of the cylinders are gathered as a manifold pipe 5 at a suitable position, for example, at a position under the engine 3. The manifold pipe 5 is connected to a muffler 6, which is generally triangular in side view. A bottom 7 of the muffler 6 is nearly parallel to the ground and ensures a predetermined minimum road clearance. An upper surface 8 of the muffler 6 extends backward and obliquely upward, with a tail pipe unit 9 being attached to a rear end of the muffler.

Reference numeral 10 identifies a front fork, 11 a head pipe, 12 a main frame, 13 a pivot frame, 14 a pivot, 15 a rear frame, 16 a seat rail, and 17 a seat.

Figure 2:
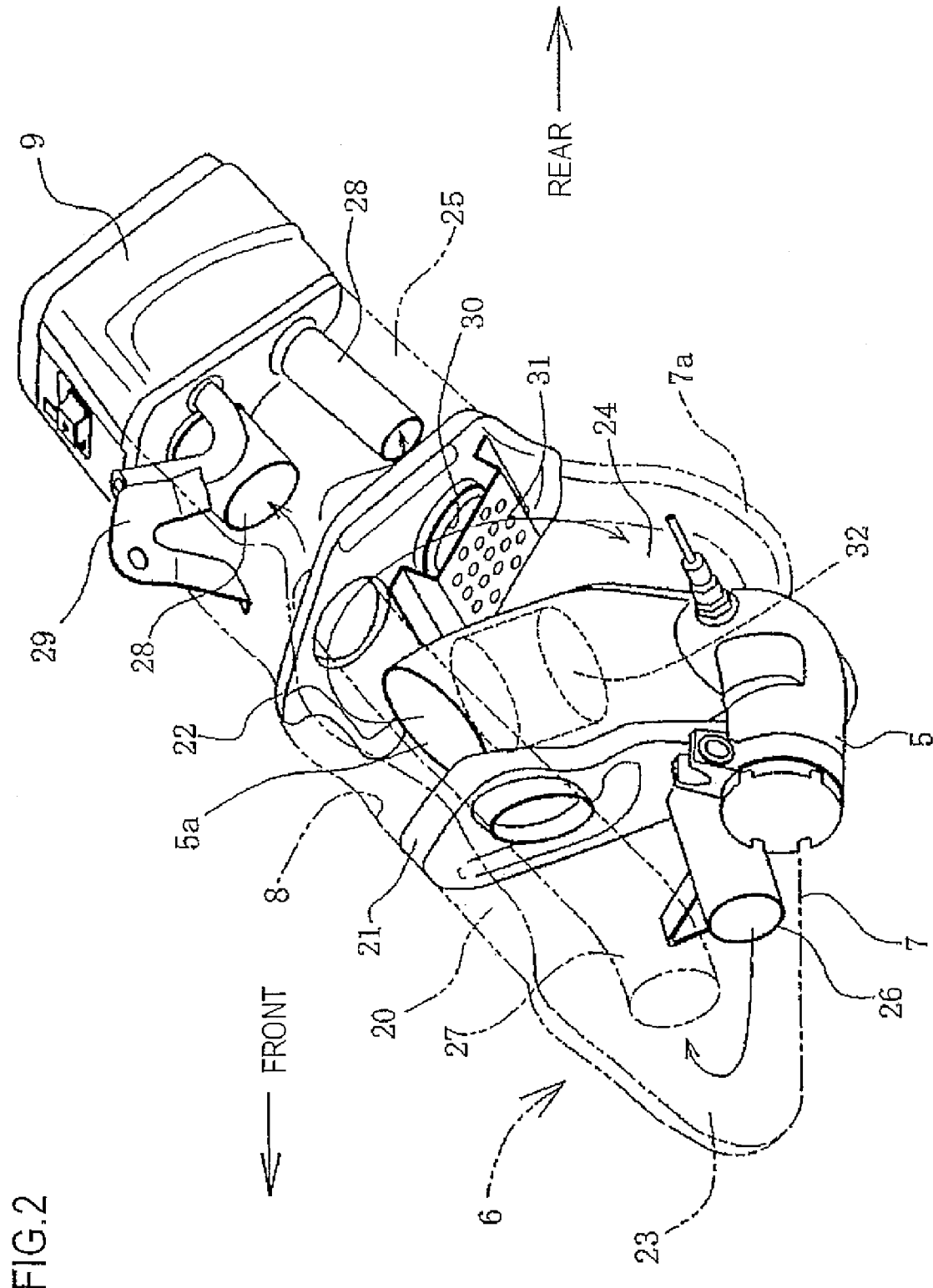
FIG. 2 is a perspective view through the interior of a muffler.

FIG. 2 is a perspective view through the interior of the muffler 6. In the muffler 6, the interior of a case 20 is partitioned into three chambers by a first separator 21 and a second separator 22, which chambers are assumed to be a first expansion chamber 23, a second expansion chamber 24 and a third expansion chamber 25 in order from the front side.

The manifold pipe 5 extends into the second expansion chamber 24 sideways of a lower portion of the second expansion chamber 24. The manifold pipe 5 extends upward substantially in parallel with the first separator 21, which is bent in the interior. An open end 5a of the manifold pipe 5 is open upward. The second expansion chamber 24 communicates with the first expansion chamber 23 through a first connecting pipe 26, which is disposed in a lower portion of the first separator 21. Exhaust gas that expands in the second expansion chamber 24 is again throttled by the first connecting pipe 26 and enters the first expansion chamber 23, in which the exhaust gas expands again.

Thereafter, the exhaust gas flows into a second connecting pipe 27 which extends through upper portions of the first and second separators 21, 22, and while being throttled thereby, the exhaust gas flows into the third expansion chamber 25, in which it undergoes the third expansion. The exhaust gas then passes through tail pipes 28 and is discharged into the atmosphere. Two pipes that are different in diameter and length are used in combination as the tail pipes. Reference numeral 29 identifies a supporting stay.

Figure 4:
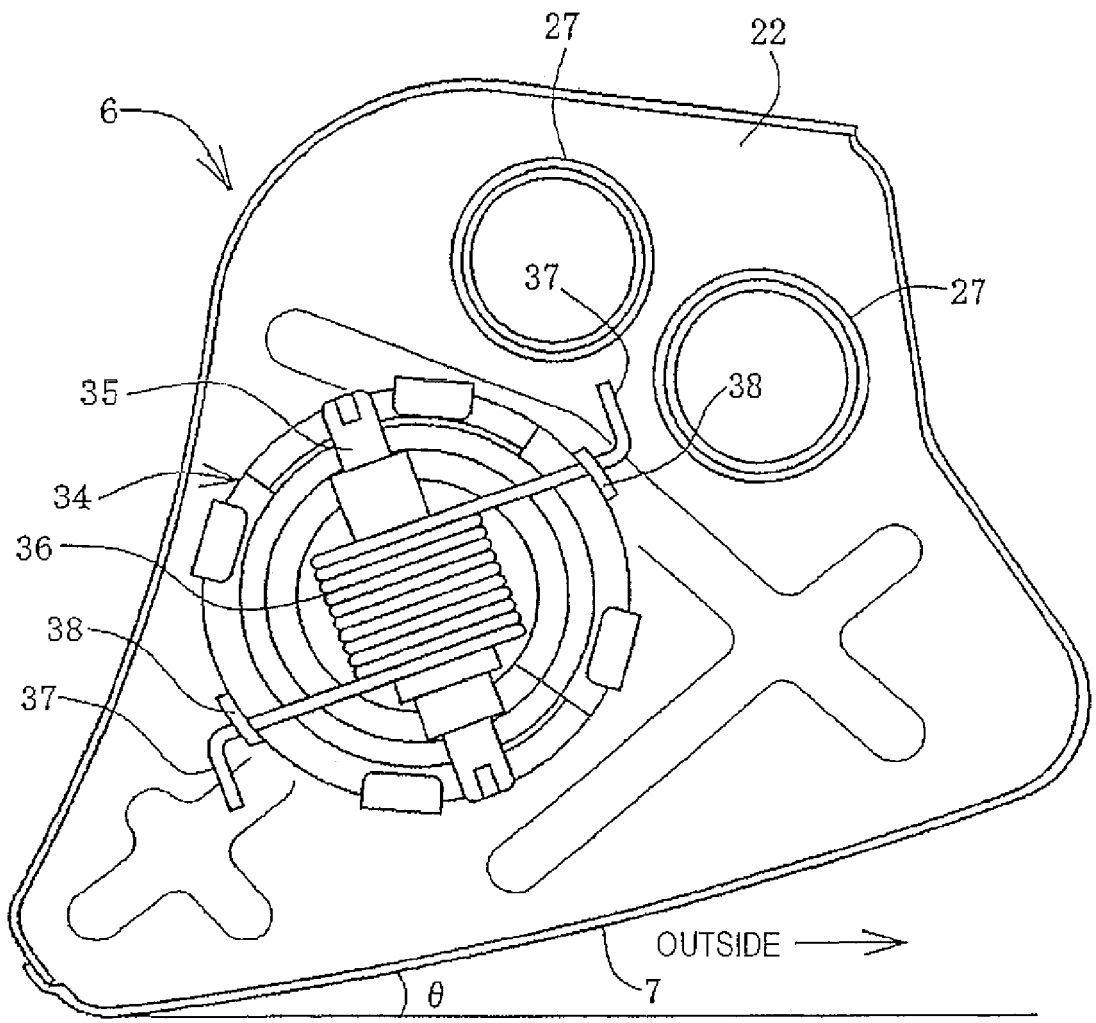
FIG. 4 is a view showing an exhaust valve from behind.

In the second expansion chamber 24, a short-circuiting aperture 30 is formed in a lower portion of the second separator 22. Under the action of a predetermined or higher exhaust pressure, an exhaust valve to be described later, which is disposed on the third expansion chamber 25 side, opens, allowing the exhaust gas to flow directly from the second expansion chamber 24 into the third expansion chamber 25 to control the exhaust pressure. The short-circuiting aperture 30 is normally closed by a normally closed type exhaust valve 34 (FIG. 4).

Reference numeral 31 identifies a heat conducting plate disposed so as to cover the short-circuiting aperture 30 from above through a slight spacing, with punched holes being formed therein.

A catalyst 32 is disposed within the manifold pipe 5 at a position near the open end 5a. The manifold pipe 5 may be a single exhaust pipe. By the generic term "exhaust pipe" as referred to herein, it is meant to include a single exhaust pipe and a manifold pipe.

Since the second connecting pipe 27 extends backward and obliquely upward, it conducts the exhaust gas flowing out from the open end 5a of the manifold pipe 5 to the upper portion side of the second separator 22. Further, the exhaust gas flows downward along the second separator 22 and reaches the short-circuiting aperture 30. When the short-circuiting aperture 30 formed in the second separator 22 is closed with the exhaust valve 34 (FIG. 4), the second separator functions as it is as a flow uniforming plate for conducting the exhaust gas to the second expansion chamber 24-side open end of the first connecting pipe 26. If the short-circuiting aperture 30 is open, the exhaust gas flows directly into the third expansion chamber 25 through the short-circuiting aperture 30. A portion 7a of the bottom 7 of the case 20, which is contiguous to the lower portion of the second separator 22, is bent toward the open end of the first connecting pipe 26. Thus, it is possible to obtain a flow uniforming effect.

Figure 3:
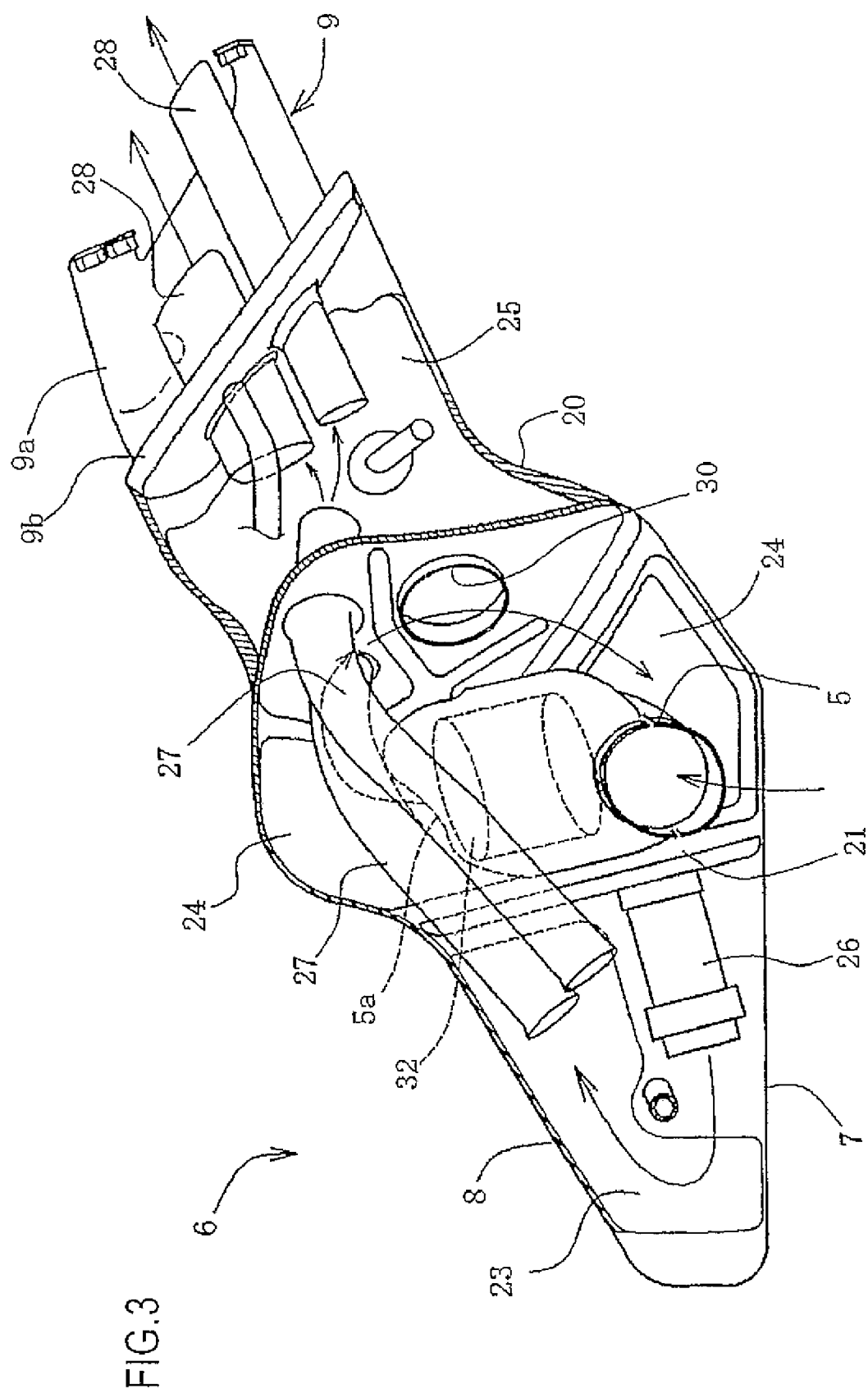
FIG. 3 is a side view thereof.

FIG. 3 is a side view through the interior of the muffler 6. As the second connecting pipe 27, two pipes are used as one set. The two pipes are disposed so as to cover in a widened state the open end 5a (see FIG. 2) of the manifold pipe 5. The muffler 6 becomes thick in the expansion chamber 24 and thereby expands its capacity, in the interior of which is accommodated the open end 5a-side portion of the manifold pipe 5. The catalyst 32, which is cylindrical, is accommodated within the manifold pipe 5 at a position near the open end 5a. According to this arrangement, the manifold pipe 5 accommodated in the interior of the second expansion chamber 24 of a relatively large capacity can be made large in diameter and capacity, so that the catalyst 32 of a sufficient capacity can be accommodated within the manifold pipe 5.

The open end 5a of the manifold pipe 5 is oriented in a slightly inclined state toward the first separator 21, so that the high-temperature exhaust gas just after leaving the opening end 5a does not directly advance toward the short-circuiting aperture 30, but strikes against the upper portion of the second separator 22 and an upper wall side of the muffler 6 and slows down, then forms a flow so as to descend along the second separator 22, whereby the exhaust gas can expand to a satisfactory extent throughout the entirety of the second expansion chamber 24.

The tail pipe unit 9 is constituted as an integral combination of the tail pipes 28, a decorative panel 9a which surrounds the tail pipes, and a partition wall through which the tail pipes 28 extend.

FIG. 4 is a diagram showing the exhaust valve from behind. The exhaust valve 34 is in the shape of a disc that covers the short-circuiting aperture 30. The exhaust valve 34 is supported pivotably by a pivot shaft 35. Around the pivot shaft 35 is mounted a return spring 36 which is a coil spring. The return spring 36 urges the exhaust valve 34 in the closing direction.

Both ends 37 of the return spring 36 are passed through mounting portions 38 provided on the outer periphery of the exhaust valve 34 and thereby urge the exhaust valve 34 for rotation. The strength of the return spring 36 is set so that the exhaust valve 34 rotates and opens under the action of a predetermined exhaust pressure. Therefore, when the exhaust pressure becomes high enough to overcome the spring load on the return spring 36, the exhaust valve 34 opens automatically, allowing the exhaust gas to flow out into the third expansion chamber 25 through the short-circuiting aperture 30 and thus making adjustment of the exhaust pressure.

Since the exhaust valve 34 opens or closes automatically in accordance with the exhaust pressure, it is not necessary to use any special actuator for control and drive and it is possible to attain a simple and substantially maintenance-free structure. In addition, since the bottom 7 of the muffler 6 is inclined outwards and obliquely upward at a slight angle θ, this also makes contribution to a large bank angle.

The operation of this embodiment will now be described. Since the manifold pipe 5 is connected sideways to the second expansion chamber 24, the manifold pipe 5 can be connected to the second expansion chamber 24 which is thick and wide. It is also possible to effect the connection of the manifold pipe 5 without exerting any influence on the minimum road clearance (FIG. 1). If the manifold pipe 5 is connected to the first expansion chamber 23, it is required to thicken the first expansion chamber. In this case, if the first expansion chamber 23 is expanded downward, the minimum road clearance H becomes smaller and so does the bank angle.

In this regard, since the muffler 6 is in a generally triangular shape of a large length in side view and its bottom 7 is made substantially horizontal, it is possible to make the minimum road clearance relatively large and thereby set a large bank angle. Also by forming the muffler in a generally triangular shape in side view and making the bottom 7 nearly parallel to the ground, it is possible to secure a minimum road clearance.

In addition, by accommodating the manifold pipe 5 into the second expansion chamber 24 of a large capacity it is possible to accommodate the catalyst 32 in the interior of the manifold pipe 5 and make the catalyst 32 large in capacity. Moreover, it is not necessary to ensure any special place for the catalyst 32 and hence it is possible to simplify the structure and reduce the size of the exhaust system. In addition, it is possible to make the entire muffler compact while ensuring the required length of the exhaust pipe.

Further more, the exhaust valve 34 is disposed in the third expansion chamber 25 partitioned by the second separator 22 from the second expansion chamber 24 into which the manifold pipe 5 opens. That is, the exhaust valve 34 is not disposed in the second expansion chamber 24 into which the exhaust gas flows out from the open end 5a while being raised in temperature through the catalyst 32. Consequently, it is possible to prevent the high-temperature exhaust gas from directly contacting the exhaust valve 34 and the return spring 36. In other words, it is possible to improve the durability of the exhaust valve 34 and that of the return spring 36. Moreover, since it is possible to diminish the influence of heat, the operation accuracy of the exhaust valve 34 is also improved.

Additionally, it is not necessary to dispose the exhaust valve 34 and the return spring 36 at any special installation place in the exterior of the muffler 6, whereby the simplification and reduction in size of the entire system can be attained.

The second connecting pipe 27 is disposed near the open end of the manifold pipe 5 to prevent the exhaust gas flowing out of the manifold pipe 5 from flowing directly toward the return spring 36, allowing the exhaust gas to flow toward the upper portion of the second separator 22 and the inner wall of the upper portion of the second expansion chamber 24. Furthermore, a flow advancing downward along the second separator 22 is created and, when the exhaust valve 34 is closed, the second separator 22 functions as a flow uniforming plate for conducting the exhaust gas to the first connecting pipe 26 smoothly as a uniform flow. The second connecting pipe 27 can also be utilized as a flow uniforming member. Upon opening of the exhaust valve 34, the exhaust gas flows out immediately into the third expansion chamber 25 through the short-circuiting aperture 30, resulting in the exhaust pressure being reduced.

The line connected to the muffler 6 from the engine side to introduce the exhaust gas into the muffler may be a manifold pipe or a single exhaust pipe. The return spring 36 is not limited to a coil spring. There may be used any of various types of springs. Furthermore, the internal structure of the muffler 6 is arbitrary insofar as the number of separators and expansion chambers are concerned.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust system for a saddle-ride type vehicle, comprising:
    an exhaust pipe located between an engine of the vehicle and a muffler and having an open end within the muffler, the exhaust pipe serving as an inlet pipe of the muffler and directing the exhaust gas discharged from the engine through the open end into the muffler;
    an exhaust valve disposed in an exhaust passage within the muffler to control the flow rate of the exhaust gas; and
    a catalyst disposed within the exhaust pipe at a position near an end of the exhaust pipe that opens into the muffler,
    wherein two separators are provided within the muffler to partition an interior of the muffler into a first expansion chamber, a third expansion chamber, and a second expansion chamber between the first expansion chamber and the third expansion chamber, the open end of the exhaust pipe being disposed in the second expansion chamber, the exhaust valve being located in the third expansion chamber, an aperture being formed in one of the separators partitioning the second and third expansion chambers and covered by the exhaust valve such that the exhaust gas in the second and third expansion chambers directly communicates with each other through the aperture only when the exhaust valve is open.

2. The exhaust system for a saddle-ride type vehicle according to claim 1, wherein the exhaust valve can open and close the exhaust passage, the exhaust valve being urged in a normally closing direction by a return spring and opening under the action of exhaust pressure.

3. The exhaust system for a saddle-ride type vehicle according to claim 1, wherein the exhaust pipe enters into the second expansion chamber without passing through the first expansion chamber.

4. The exhaust system for a saddle-ride type vehicle according to claim 1, wherein the one of the separators functions as an exhaust gas flow uniforming plate when the aperture is closed by the exhaust valve.

5. The exhaust system for a saddle-ride type vehicle according to claim 1, wherein the exhaust pipe is a manifold pipe that is connected to the engine, and the catalyst is located completely within the boundaries of the muffler.

6. The exhaust system for a saddle-ride type vehicle according to claim 1, wherein the catalyst is located within the second expansion chamber, and the second expansion chamber is the middle expansion chamber.

7. The exhaust system for a saddle-ride type vehicle according to claim 6, further comprising a first connecting pipe that connects the second expansion chamber to the first expansion chamber and a second connecting pipe that connects the first expansion chamber to the third expansion chamber.

8. The exhaust system for a saddle-ride type vehicle according to claim 7, wherein the second connecting pipe extends backward and obliquely upward above the open end of the exhaust pipe, the second connecting pipe conducting the exhaust gas flowing out from the open end of the exhaust pipe to an upper portion side and then downward along the separator between the second and third expansion passages to the exhaust valve.

9. An exhaust system for a vehicle, comprising:
a muffler having a generally triangular shape;
an exhaust pipe, located between an engine of the vehicle and the muffler and having an open end within the muffler, the exhaust pipe serving as an inlet pipe of the muffler and directing the exhaust gas discharged from the engine through the open end into the muffler;
an exhaust valve disposed in an exhaust passage within the muffler to control the flow rate of exhaust gas within the muffler; and
a catalyst disposed within the exhaust pipe and within the muffler,
wherein two separators are provided within the muffler to partition an interior of the muffler into a first expansion chamber, a third expansion chamber, and a second expansion chamber between the first expansion chamber and the third expansion chamber, the open end of the exhaust pipe being disposed in the second expansion chamber, the exhaust valve being located in the third expansion chamber, an aperture being formed in one of the separators partitioning the second and third expansion chambers and covered by the exhaust valve such that the exhaust gas in the second and third expansion chambers directly communicates with each other through the aperture only when the exhaust valve is open.

10. The exhaust system for a vehicle according to claim 9, wherein the exhaust valve can open and close the exhaust passage, the exhaust valve being urged in a normally closing direction by a return spring and opening under the action of exhaust pressure.

11. The exhaust system for a vehicle according to claim 9, wherein the one of the separators functions as an exhaust gas flow uniforming plate when the aperture is closed by the exhaust valve.

12. The exhaust system for a vehicle according to claim 9, wherein the exhaust pipe is a manifold pipe, and the catalyst is located completely within the boundaries of the muffler.

13. The exhaust system for a vehicle according to claim 9, wherein the catalyst is located within the second expansion chamber, and the second expansion chamber is the middle expansion chamber.

14. The exhaust system for a vehicle according to claim 13, further comprising a first connecting pipe that connects the second expansion chamber to the first expansion chamber and a second connecting pipe that connects the first expansion chamber to the third expansion chamber.

15. The exhaust system for a vehicle according to claim 14, wherein the second connecting pipe extends backward and obliquely upward above the open end of the exhaust pipe, the second connecting pipe conducting the exhaust gas flowing out from the open end of the exhaust pipe to an upper portion side and then downward along the separator between the second and third expansion passages to the exhaust valve.

16. The exhaust system for a vehicle according to claim 14, wherein the exhaust pipe enters into the second expansion chamber without passing through the first expansion chamber.

* * * * *